April 10, 1951 A. V. LOUGHREN 2,548,436

TELEVISION RECEIVER BACKGROUND CONTROL CIRCUIT

Filed July 25, 1946 2 Sheets-Sheet 1

INVENTOR:
ARTHUR V. LOUGHREN,
BY Harry C. Page
ATTORNEY.

April 10, 1951 A. V. LOUGHREN 2,548,436

TELEVISION RECEIVER BACKGROUND CONTROL CIRCUIT

Filed July 25, 1946 2 Sheets-Sheet 2

INVENTOR:
ARTHUR V. LOUGHREN,

BY Harry C. Page

ATTORNEY.

Patented Apr. 10, 1951

2,548,436

UNITED STATES PATENT OFFICE 2,548,436

TELEVISION RECEIVER BACKGROUND CONTROL CIRCUIT

Arthur V. Loughren, Great Neck, N. Y., assignor, by mesne assignments, to Hazeltine Research, Inc., Chicago, Ill., a corporation of Illinois Application January 25, 1946, Serial No. 643,288

12 Claims. (Cl. 178—7.5)

Figures 1, 9:
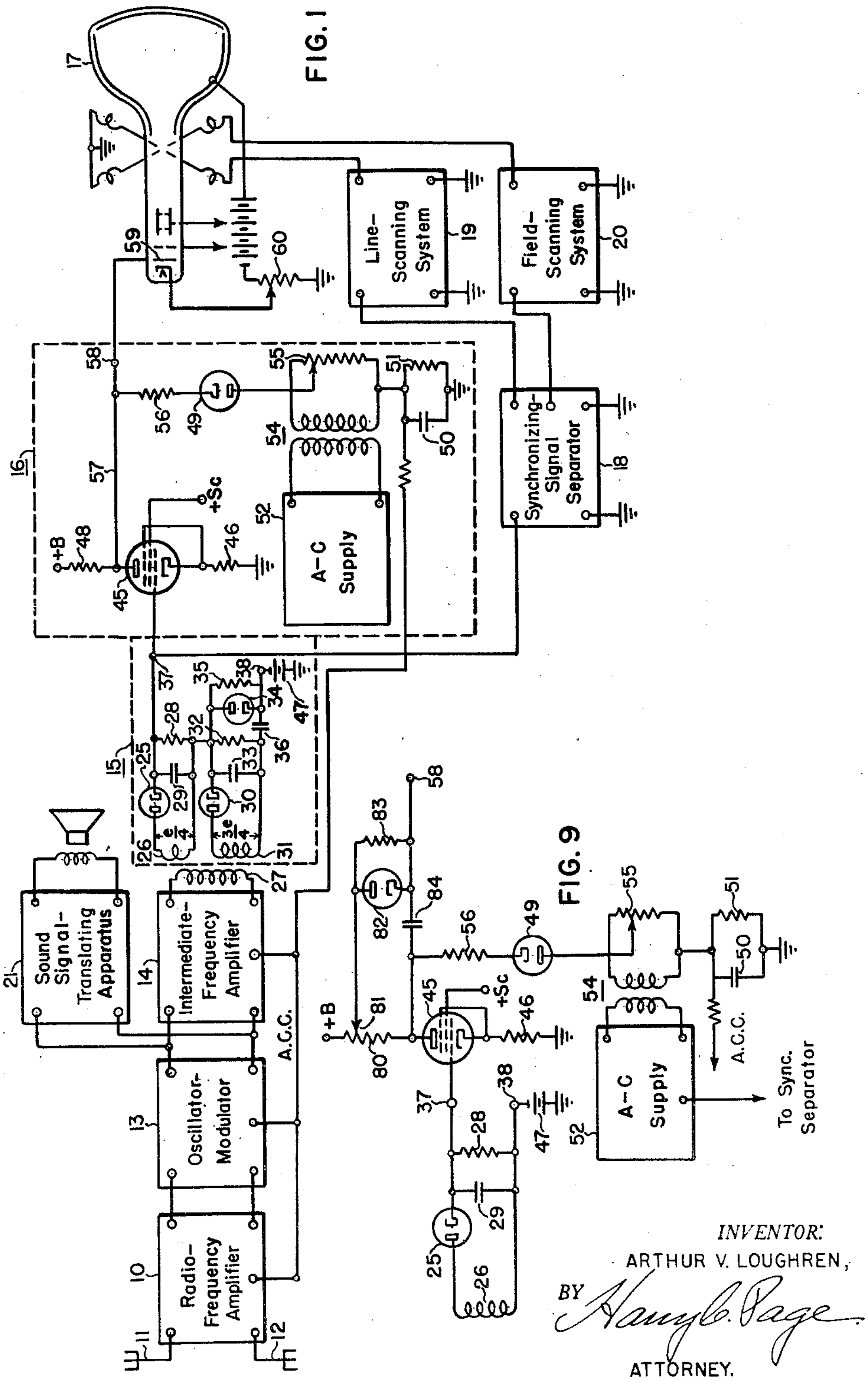

The present invention relates to television receiver background control circuits and is particularly directed to the improvement of the contrast-brightness characteristic of such circuits. While the teachings of this invention may be applied to a transmitting system, they have special application to a receiving system intended to utilize a negatively modulated carrier-wave television signal and will be set forth in that environment.

In present day practice, the composite television signal transmitted to a receiver comprises a carrier-wave signal modulated during recurrent trace periods with video frequency and low frequency or direct current components, representing light variations in an image being transmitted and its average background illumination, respectively. During intervening retrace periods the carrier signal is modulated with synchronizing-signal components. Where negative modulation is employed, a certain amplitude range of the carrier-wave signal, say up to 75 per cent. of the maximum carrier amplitude, is devoted to the transmission of the video information. The lower limit of the modulation range used to transmit video components designates the white level, its upper limit corresponds to the black level, and a decrease in carrier-wave amplitude within the range denotes an increase in illumination. The final portion of the carrier amplitude, from 75 to 100 per cent., is assigned to the transmission of the synchronizing signals including line-frequency components which intervene succeeding line-trace periods and field-frequency components coming between successive field-trace periods. Each synchronizing component extends from the black level of the video signal a fixed amount into the blacker-than-black region. At the receiver, the described composite signal is detected and its video-modulation components are utilized to modulate the intensity of the beam of a cathode-ray type reproducing device. The synchronizing components of the signal control scanning apparatus at the receiver and synchronize the scanning of its cathode-ray beam with the corresponding operation of similar apparatus utilized at the transmitter in developing the transmitted signal. In this manner the transmitted image is reconstructed at the receiver.

An important requirement in a properly operating receiver is accurate stabilization of the detected signal with respect to a well-defined signal level, such as the black level. Stabilization of this type is necessary to facilitate adjusting the reproducing device so that a given signal level or amplitude corresponding to black is effectively held fixed with respect to its signal input-brightness characteristic. This operating requirement is necessary in order that signal components representing any other given shade value at all times appear with the proper value in the reproduced image. Also, where the receiver utilizes A.-C. coupling arrangements between stages, signal stabilization is required in order to ensure that the background illumination component is present in the signal applied to the reproducing device.

Furthermore, the eye of an observer is responsive primarily to the contrast or ratio between illumination values rather than the absolute value of any given shade of illumination. Therefore, it is desirable to provide an arrangement for adjusting the extreme values of illumination in the reproduced image. Such an adjustment is referred to as a contrast control and permits adjustment of the receiver in accordance with conditions of reception and the type of picture being received.

In conventional receivers of one type, signal stabilization is obtained through a diode circuit which peak rectifies the synchronizing components of the detected signal, stabilizing this signal with respect to its synchronizing peaks. Additionally, a gain control is frequently included in one of the video-frequency amplifier stages for effecting contrast regulation. Such an arrangement does effect stabilization but does not preserve the contrast-brightness characteristic of the receiver as uniform as may be desired in certain installations. This is because the black level of a negatively modulated signal is at an amplitude that is appreciably less than the peak amplitude represented by the synchronizing-signal components. Therefore, as the incoming signal intensity varies, the black level tends to deviate considerably with reference to the stabilization level. Accordingly, with such receivers a very accurate gain-control arrangement is required, or adjustment of the brightness control is necessary with variations in signal intensity, if the black level is to be held fixed with respect to the signal input-brightness characteristic of the reproducing device.

In another prior receiver, the contrast control is in the form of a voltage divider associated with a video-frequency amplifier, while a potentiometer coupled to the cathode of the cathode-ray reproducing tube functions as a brightness control. These adjustable elements are mechanically interconnected and unicontrolled, whereby the brightness setting is compensated for each variation in the contrast control to keep the black level fixed with respect to the signal input-brightness characteristic of the reproducing device. This arrangement performs satisfactorily only when the intensity of the received signal is closely maintained at a fixed value.

It is an object of the present invention, therefore, to provide a television receiver background control circuit which avoids one or more of the above-mentioned limitations of prior arrangements.

It is another object of the invention to provide a television receiver background control circuit having an improved contrast-brightness characteristic.

It is a specific object of the invention to provide a television receiver background control circuit having an improved stabilization and contrast control arrangement.

In accordance with the invention, a television receiver background control circuit comprises means for obtaining a video signal, including recurrent components, video frequency components and the direct-current components, in which said recurrent components represent the maximum amplitude of the video signal, as measured from a first reference level, while a predetermined fractional portion of the maximum amplitude represents the black level of the video signal. The system has a circuit arrangement for deriving a second signal including recurrent components and video frequency components, one of said last-mentioned components having amplitude values with respect to a second reference level which are equal but of opposite polarity to and vary in substantially the same manner with variations in signal intensity as the black level of the video signal with respect to the first-mentioned reference level. Additionally, means are provided for combining the video signal and the second signal to produce an output video signal and means for so stabilizing the second signal that the black level of the output signal is made substantially independent of variations in the signal intensity of the first-mentioned video signal.

For a better understanding of the present invention, together with other and further objects thereof, reference is had to the following description taken in connection with the accompanying drawings, and its scope will be pointed out in the appended claims.

Figure 4:
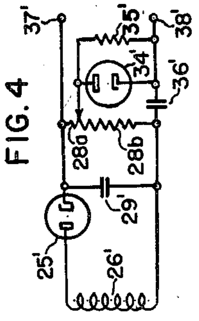
Figure 6:
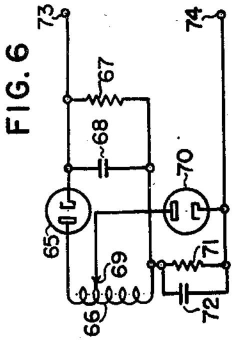
Figure 7:
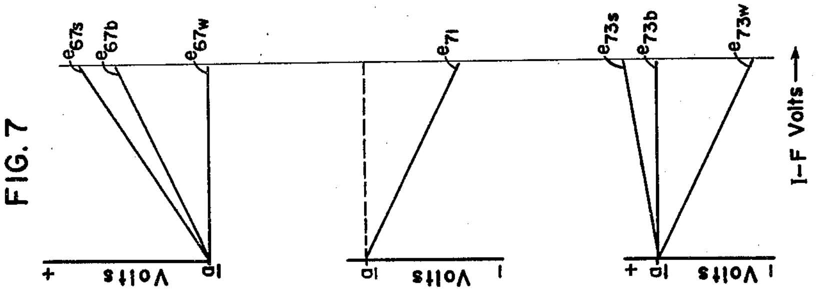
Figure 5:
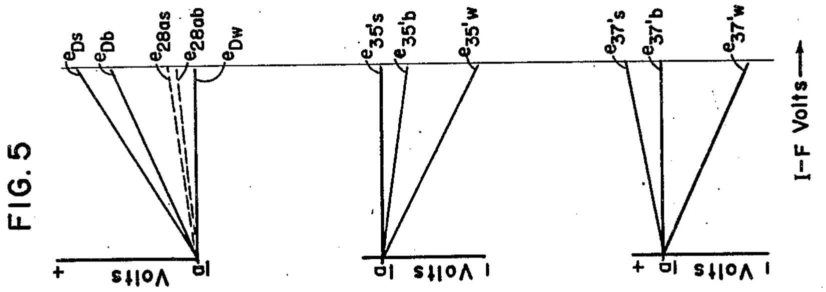
Figure 3:
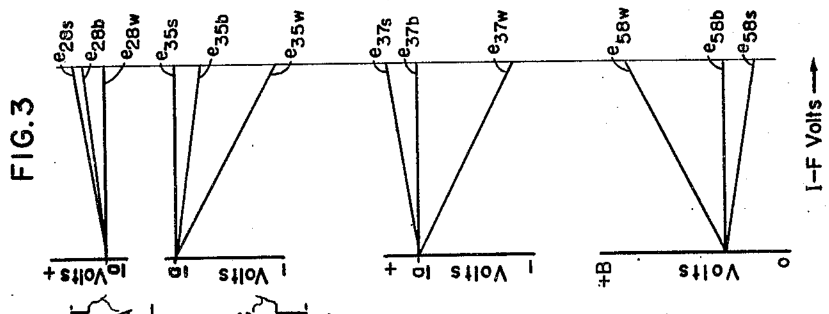
Figure 2:
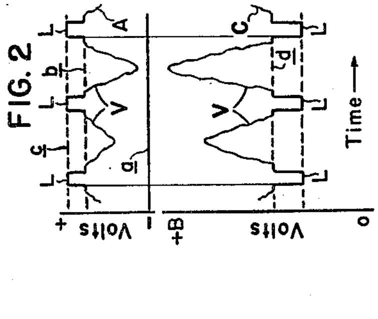

In the drawings, Fig. 1 is a circuit diagram, partly schematic, of a complete television carrier-signal receiver embodying the invention; Figs. 2 and 3 include graphs used in explaining the operation of the invention; Fig. 4 represents a modification of the invention; Fig. 5 comprises graphs used in describing the operation of the Fig. 4 arrangement; Fig. 6 illustrates another embodiment of the invention; Fig. 7 includes curves representing the operation of the Fig. 6 arrangement; while Figs. 8 and 9 comprise further modifications of the invention.

Referring now more particularly to Fig. 1, the television carrier-signal receiver there represented includes a radio-frequency amplifier 10 of any desired number of stages, having its input circuit connected to an antenna system 11, 12 and having its output circuit connected to an oscillator-modulator 13. Coupled in cascade with oscillator-modulator 13, in the order named, are an intermediate-frequency amplifier 14 of one or more stages, a detector 15, a video-frequency amplifier and automatic-contrast-control (A. C. C.) circuit 16, and an image-reproducing device 17 of the cathode-ray tube type. Units 15 and 16 are described more particularly hereinafter. There is also coupled to detector 15 a synchronizing-signal separator 18, having output circuits connected with a line-scanning system 19 and a field-scanning system 20. The output circuits of these scanning systems, in turn, are connected with appropriate beam-deflecting windings of tube 17. The output circuit of the A. C. C. circuit included in unit 16 is connected to the input circuits of one or more of the tubes of radio-frequency amplifier 10, oscillator-modulator 13, and intermediate-frequency amplifier 14 in conventional manner.

A sound signal-translating apparatus 21 is also connected to the output circuit of oscillator-modulator 13. It may include one or more stages of intermediate-frequency amplification, a detector, one or more stages of audio amplification, and a sound reproducing device.

It will be understood that the various units thus far described, with the exception of detector 15 and the video-frequency amplifier and A. C. C. circuit 16, may be of conventional construction and operation. The details of such components are well known in the art, rendering a further description thereof unnecessary. Considering briefly the operation of the receiver as a whole, and neglecting for the moment the specific operation of units 15 and 16, a desired modulated carrier-wave television signal is intercepted by antenna system 11, 12. This signal is selected and amplified in radio-frequency amplifier 10 and applied to oscillator-modulator 13 where it is converted to an intermediate-frequency signal. The intermediate-frequency signal is selectively amplified in amplifier 14 and is detected by detector 15 to derive the modulation components thereof. These modulation components, which comprise synchronizing components and video-frequency components, are applied to the video-frequency amplifier of unit 16 for amplification and are thereafter applied to the brilliancy control electrode of image reproducer 17 to modulate the intensity of the electron beam thereof in accordance with the video-frequency components. The synchronizing-signal components of the received signal are separated from the video-frequency components in separator 18 and are used to synchronize the operation of the line-scanning and field-scanning systems 19 and 20, respectively. These systems generate scanning signals of saw-tooth wave form which are properly synchronized with reference to the received signal and are applied to the deflecting elements of the image reproducer, thereby to deflect the cathode-ray beam of tube 17 in two directions normal to each other to reproduce the received television image.

The automatic-contrast-control or A. C. C. signal derived in unit 16 is effective to control the amplification of one or more of units 10, 13, and 14 to maintain the signal input to detector 15 within a relatively narrow range for a wide range of received signal intensities.

The sound signal-modulated carrier wave accompanying the desired vision modulated carrier wave is also intercepted by antenna system 11, 12. It is selected and amplified in radio-frequency amplifier 10 and applied to oscillator - modulator 13 where it is converted to a sound-modulated intermediate-frequency signal. The sound-modulated intermediate-frequency signal is applied to apparatus 21 wherein it is amplified and detected to derive the modulation components which are further amplified and reproduced by the sound-reproducing device.

Referring now more particularly to detector 15 which embraces one salient feature of the invention, the arrangement there represented comprises means for obtaining a video signal having a black level identified more specifically hereinafter. This means, in the embodiment under consideration, comprises a diode 25 which is coupled to intermediate-frequency amplifier 14 by virtue of an inductive coupling between inductors 26 and 27, the latter being included in the output circuit of the intermediate-frequency amplifier. Diode 25 has a load resistor 28 which is by-passed for signals of the intermediate frequency by a condenser 29.

The detector 15 also has means for deriving a second signal, including recurrent components and video frequency components, one component having an amplitude characteristic related to the black level of the video signal established across load resistor 28, as will be made clear hereinafter. This last-named means includes a second diode 30, coupled to intermediate-frequency amplifier 14 by way of an inductive coupling between inductors 31 and 27. The load resistor 32 of diode 30 is similarly by-passed for intermediate-frequency signals by a condenser 33. A stabilizing circuit is coupled across resistor 32 and comprises an additional diode 34, a resistor 35, and a condenser 36. This stabilizing circuit comprises means for so stabilizing the above-mentioned second signal that the black level of the output signal is made substantially independent of variations in the signal intensity of the video signal. Elements 35 and 36 have a time constant which is long with reference to the periodicity of recurrent line-synchronizing components included in the received television signal. The output terminals of detector 15 are designated 37, 38. They are conductively connected in series with resistor 28 and the stabilizing circuit including diode 34 and constitute means for combining the video signal obtained by detector 25 with the second but stabilized signal obtained by diode 34 to produce an output video signal for application to unit 16.

The video-frequency amplifier and A. C. C. circuit 16 is generally similar to unit 16 of application Serial No. 643,287, now abandoned, filed concurrently herewith in the name of Arthur V. Loughren and assigned to the same assignee as the present invention. Reference may be had to the copending application for a detailed discussion of the construction and operation of this unit. Briefly, it comprises a vacuum-tube amplifier including a pentode-type tube 45 which has, among others, an anode, a cathode, and a control electrode. The input electrodes of tube 45 are conductively connected to output terminals 37 and 38 of detector 15 through a cathode resistor 46 and a bias source 47. The amplifier has an anode-load impedance 48 for connecting its output electrodes in series with a source of unidirectional potential of positive polarity indicated +B. The opposite terminal of this source is grounded.

The A. C. C. circuit of unit 16 includes a diode rectifier 49 having an integrating load circuit provided by the parallel combination of a condenser 50 and a resistor 51, one terminal of this combination being grounded as illustrated. A potential supply arrangement connects the rectifier and its load circuit in a direct current series circuit with the anode-load impedance 48 of the amplifier. The potential supply circuit referred to comprises an alternating current supply source 52 which may be selected to generate an alternating current signal having a frequency which is very high in comparison with the repetition frequency of the line-synchronizing components of the received carrier-wave televison signal. The output circuit of supply source 52 includes the primary winding of a transformer 54 and the secondary winding of the transformer is terminated in a voltage divider 55. The anode electrode of rectifier 49 is conductively connected with the high-potential terminal of integrating circuit 50, 51 through the tap of this voltage divider. An isolating resistor 56 and a conductor 57 connect the cathode of rectifier 49 to the low-potential terminal of the anode load 48 of the amplifier and complete the direct current series circuit of the rectifier and its integrating load circuit with the load impedance 48. Unit 16 has an output terminal 58 to which the brilliancy control electrode 59 of cathode-ray tube 17 is conductively connected. The cathode of tube 17 is grounded through a voltage divider 60 which constitutes a brightness control.

In considering the operation of units 15 and 16, it will be assumed that the signal voltage across inductor 27 in the output circuit of intermediate-frequency amplifier 14 has a value $e$ for a received signal of a given intensity. Inductor 26 is selected to apply to diode 25 a signal intensity equal to $e/4$, while inductor 31 applies to diode 30 a signal of $3e/4$. The applied intermediate-frequency signal is detected in the circuit of diode 25, establishing across resistor 28 in conventional manner a video signal, a portion of which is represented by curve A of Fig. 2. This signal is derived by detection of a negatively modulated carrier-wave television signal of the type described above. The horizontal line $a$ is a reference level which exists in the circuit of diode 25 in the absence of received signals due to bias source 47. The potential variations of load resistor 28, in the presence of a received television signal, are in a positive sense or direction from this reference $a$. The portion of the detected signal illustrated includes video-modulation components V as well as recurrent line-frequency synchronizing-signal components L superimposed on the black level of the received signal in well-known manner. This signal also includes its received direct current component so that the black level is at a fixed amplitude $b$, corresponding to the upper limit of the video range. The synchronizing pulses L are also aligned at a fixed level $c$, corresponding to the maximum amplitude of the received signal as measured from reference $a$. While the black level $b$ and synchronizing peak level $c$ are fixed for received signals of one intensity, they vary proportionally and in the same sense with variations in intensity of the intermediate-frequency signal.

By the term "maximum amplitude" is meant the greatest signal excursion from a fixed reference level. For the signal of curve A, the synchronizing pulses L represent the maximum amplitude as measured in the positive direction from the reference level $a$. Where an oppositely poled signal is derived from the detector, the synchronizing components again designate the maximum amplitude but extend in an opposite direction from the reference $a$. Viewed with respect to the received carrier-wave signal, the maximum amplitude is the greatest signal variation from the alternating current axis.

Referring again to Fig. 2, the amplitude range *a*—*b*, in accordance with the foregoing definition of a negatively modulated signal, represents the amplitude range of the received carrier signal devoted to the transmission of video information. It extends to 75 per cent. of the maximum carrier amplitude. The range *b*—*c* is allotted to the synchronizing information and extends to full carrier amplitude. In accordance with this definition, the black level *b* corresponds to a predetermined fractional portion (75 per cent.) of the maximum signal amplitude.

The applied intermediate-frequency signal is also detected in the circuit of diode 30, establishing a second video signal across its load resistor 32. Thus, two video signals of identical composition but different intensities are obtained from the signal output of intermediate-frequency amplifier 14. One is established across resistor 28 of diode 25 and the other across resistor 32 of diode 30 and their ratio is one to three. The larger signal is applied to diode 34 and stabilized with respect to its synchronizing-signal components L in conventional manner. The combination of (1) the video signal of detector 25 and (2) the stabilized video signal of detector 30 and stabilizing diode 34 provides at output terminals 37, 38 an output video signal that is stabilized with respect to its black level. This will be apparent from the series of curves of Fig. 3.

In this series and those of the remaining figures, the numerical subscripts designate the circuit elements at which the signals represented are obtained. The subscripts *w*, *b*, and *s* stand for white, black, and synchronizing amplitude levels, respectively, of each signal. Thus, the group of curves $e_{28}$ show the variations in black level and synchronizing tip level of the video signal obtained at resistor 28 with variations in intensity of the intermediate-frequency signal supplied by amplifier 14. This representation assumes an ideal case in which the white level of the transmitted picture is denoted by a modulation of the carrier wave to zero amplitude. The next group of curves $e_{35}$ shown corresponding variations of the stabilized signal obtained from resistor 35, stabilized in conventional manner with respect to the peaks of the synchronizing components. It will be noted that the black-level component $e_{35b}$ of the stabilized video signal has amplitude values with respect to a reference level, specifically, the stabilization level $e_{35s}$, which are equal to and vary in substantially the same manner with signal intensity as the black level $e_{28b}$ of the first video signal obtained by detector 25 varies with reference to the level $e_{28w}$.

The addition of these two groups, effected by the series connection of resistors 28 and 35, produces at output terminal 37 the output video signal represented by the group of curves $e_{37}$. The output video signal is stabilized with respect to its black level $e_{37b}$, that is, its black level is maintained at a fixed amplitude irrespective of variations in intensity of the intermediate-frequency signal. This output signal is reversed in polarity in translation through amplifier 45. Therefore, the group of curves $e_{58}$ denote the signal supplied from the output terminal 58 of unit 16 to the brilliancy control electrode 59 of cathode-ray tube 17. The brightness control 60 of the cathode-ray tube is preferably adjusted so that the tube is cut off for signals equal to or less than the black level $e_{58b}$. The output of the video amplifier for one operating condition is represented by curve C of Fig. 2. The horizontal line *d* denotes the black level of the signal and the level at which the brightness control 60 preferably biases the cathode-ray tube 17 to cutoff.

For one mode of operation of the automatic-contrast-control circuit including diode 49 of unit 16, the potentials applied to amplifier 45 are selected so that the potential level *d* of Fig. 2 also indicates the anode potential of the amplifier in the absence of signals applied to its input circuit. The potential variations at this anode correspond with the variations of potential across load impedance 48 from its no-signal potential condition, that is, from the potential established by the load impedance 48 when no signals are present in the input circuit of the amplifier. In particular, the anode-potential variations from its no-signal level *d* which result from the translation of the line-synchronizing components L of the applied signal A are in a sense tending to render rectifier 49 conductive. That is to say, the translation of such components causes the anode potential of tube 45 to be less positive than its no-signal value *d* which is a potential variation in a negative direction and, as applied to the cathode of diode 49, is in a sense to render the rectifier conductive. The response of the rectifier to these potential variations is under the control of generator 52, as will appear presently.

As described in the above-identified copending application the discharge time constant of integrating circuit 50, 51 is, preferably, long in comparison with the periodicity of the line-synchronizing components L. Also the peak amplitude of the alternating current potential supplied by unit 52 may be selected to be equal to the direct current potential level *d* of the anode of tube 45 in the absence of signals applied to its input circuit. Additionally, in one embodiment the operating frequency of supply 52 is chosen to be so high in comparison with the repetition frequency of the line-synchronizing components L that at least one cycle of the potential supplied therefrom occurs within the duration of each line-synchronizing component. Therefore, there is a net positive potential on the anode of rectifier 49 some time during the translation of each line-synchronizing component by amplifier 45. The rectifier is thereby rendered conductive and peak rectifies only the potential variations resulting from the translation of such synchronizing-signal components. The resulting A. C. C. signal developed in load circuit 50, 51 has an amplitude determined by the amplitude of the line-synchronizing components L. It is applied by way of the A. C. C. conductor to radio-frequency amplifier 10, oscillator - modulator 13, and intermediate-frequency amplifier 14, controlling the gain characteristic of these components to maintain the signal input to detector 15 within a relatively narrow range for a wide range of received signal intensities. Consequently, the intensity of the signal supplied to cathode-ray tube 17 is maintained within a correspondingly narrow range of values and the contrast of the reproduced image is held substantially constant.

The voltage divider 55 constitutes a contrast control for selectively adjusting the intensity of the video signal supplied to cathode-ray tube 17. When adjusted in the manner described in the preceding paragraph, it establishes a substantially uniform contrast in the reproduced image for a wide range of intensities of received signals. The potential divider may be adjusted, if desired.

to cause the peak amplitude of the alternating current potential applied to diode 49 to be much less than the no-signal anode potential *d* of amplifier 45. With such an adjustment, a very large potential variation of load impedance 48 is required before the diode is rendered conductive to generate the A. C. C. signal. This permits the receiver to have a higher gain and increases the contrast of the reproduced image. Since the signal output of detector 15 is always stabilized with respect to its black level, as demonstrated by the group of curves $e_{58}$, the contrast control 55 may be adjusted without upsetting or requiring compensating adjustments of the brightness control 60 of the cathode-ray tube 17. The black level of the signal stabilized in this manner is held fixed with respect to the signal input-brightness characteristic of tube 17 and is independent of signal intensity or adjustments of the contrast control 55. Accordingly, the receiver has a desirable contrast-brightness characteristic.

A modified form of detector 15 is represented in Fig. 4 and components thereof which correspond with the embodiment of Fig. 1 are indicated by the same reference numerals primed. It includes a first diode 25' which may be coupled through an inductor 26' to the intermediate-frequency amplifier 14. Its load resistor is in the form of a potential divider which is effectively divided into two portions 28*a* and 28*b* by its tap. This divider is by-passed for intermediate-frequency signals by a condenser 29'. A conventional stabilizing circuit is coupled across the voltage-divider portion 28*b*. It comprises a diode 34', a resistor 35', and a condenser 36'. Elements 35' and 36' have the same time constant as the corresponding elements 35 and 36 of Fig. 1. The arrangement has output terminals 37' and 38' through which it may be connected to unit 16 of Fig. 1.

The operation of the Fig. 4 embodiment is represented by the curves of Fig. 5. Neglecting the effect of stabilizing diode 34', an applied intermediate-frequency signal is detected in conventional manner, establishing across the entire voltage divider the signal represented by the group of curves $e_D$. The voltage-divider section 28*a* permits a portion of this signal to be obtained with its received direct current component, as shown by the group of curves $e_{28a}$. The tap of the voltage divider is chosen so that this portion is equal to one-quarter of the signal voltage developed by the entire voltage divider. The remaining three-quarters of this total signal voltage is stabilized by diode 34' and produces a second signal represented by the group of curves $e_{35'}$. The terminals 37', 38' which effectively connect the voltage-divider portion 28*a* in series with resistor 35' combine the signals developed thereacross to produce the output signal indicated by the group of curves $e_{37'}$. This signal is stabilized with respect to its black level $e_{37'b}$. Essentially, the Fig. 4 arrangement is the same as the detector unit of Fig. 1, modified to utilize a single diode for detecting the intermediate-frequency signal. In all other respects the operation of these arrangements is the same.

In the modification represented by Fig. 6, the detector arrangement includes a diode 65, an inductor 66 for coupling the diode with the intermediate-frequency amplifier, and a load resistor 67 by-passed for signals of the intermediate frequency by a condenser 68. A tap 69 of inductor 66 is coupled to an additional diode 70 having an integrating load circuit comprising a resistor 71 and a condenser 72. The discharge time constant of elements 71 and 72 is long with reference to the periodicity of the line-synchronizing components L. This arrangement has output terminals 73 and 74 through which it may be coupled to unit 16 of the receiver.

The curves of Fig. 7 represent the operation of the Fig. 6 arrangement in deriving an output video signal stabilized with respect to its black level. The curves are based upon a selection of tap 69 which applies three-quarters of the signal voltage of inductor 66 to diode 70. The group of curves $e_{67}$ represents the variations of the video signal developed across load resistor 67 with variations in intensity of the applied intermediate-frequency signal. Curve $e_{71}$ designates the signal voltage developed in the integrating circuit 71, 72 in response to the same intermediate-frequency signal. The synchronizing components of the intermediate-frequency signal are peak rectified in the circuit of diode 70 to develop the signal $e_{71}$ which includes no video information but only represents the peak amplitude of the applied intermediate-frequency signal, established in conventional manner by peak rectification of its synchronizing-signal components. The signal output obtained at terminals 73, 74 represents the combination of the detected video signal derived by rectifier 65 and the signal $e_{71}$ obtained by peak rectification of the line-synchronizing components. The output video signal is represented by the group of curves $e_{73}$ and is stabilized with respect to its black level $e_{73b}$.

Figure 8:
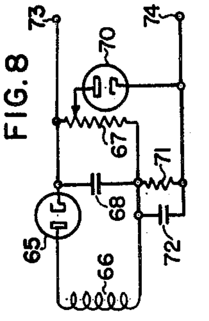

The modification represented by Fig. 8 is similar to that of Fig. 6, corresponding components thereof being identified by the same reference characters. With this modification however, the peak rectifier 70 is coupled to a tap on the load impedance 67. This tap is chosen to apply three-quarters of the signal voltage of the load impedance to the peak-rectifier circuit. The operation of this arrangement is also represented by the curves of Fig. 7.

In each of the detector arrangements thus far described, two signals are obtained (1) a video signal including its received direct current component and (2) a second signal which does not have the received direct current component, but which includes a component that has amplitude levels which are equal to and vary in substantially the same manner from a reference level with variations in signal intensity, as the black level of the first-mentioned signal varies from some reference level. The combination of these signals produces the desired output signal stabilized with respect to its black level. While the final output signal is suitable for application to the A. C. C. system of unit 16 to derive a control signal, the control does not have maximum sensitivity because in each of the arrangements described 75 per cent. of the received direct current component is lost in the detector 15. This may be more fully understood from a further examination of the curves of Fig. 5.

In the group of curves designated $e_D$, representing the detected video signal available across the entire voltage-divider load of detector 25', the potential of the synchronizing components $e_{Ds}$ is measured with reference to the level $e_{Dw}$ for any particular intensity of the applied intermediate-frequency signal. Since this detected signal includes its received direct current component, rectification of its synchronizing components, in an arrangement of the type disclosed in the aforementioned copending application, yields a sensitive A. C. C. control effect. However, in all embodiments of the invention thus far described, the signal applied to the video amplifier and A. C. C. circuit 16 is of the type denoted by the group of curves $e_{37'}$. In such cases the A. C. C. system derives a control signal representing the amplitude of the synchronizing components $e_{37's}$ as measured from the stabilized black lever $e_{37'b}$ for a given intensity of the applied intermediate-frequency signal. The synchronizing-component amplitude measured from this level is only 25 per cent. of that of the signal present across the entire voltage divider and the sensitivity of the A. C. C. effect is decreased a corresponding amount. Therefore, black-level stabilization in the embodiments already discussed is at the expense of some A. C. C. sensitivity.

An improvement in the A. C. C. control may be realized with the embodiment of Fig. 9. To a large extent, this arrangement is similar to units 15 and 16 of Fig. 1, corresponding components thereof being designated by the same reference characters. The detector is conventional, comprising the diode 25, its exciting winding 26, and its load resistor 28 by-passed by a condenser 29. The anode load impedance of amplifier 45 is in the form of a voltage divider 80. The A. C. C. diode 49 is conductively connected with the anode of tube 45. A stabilizing circuit is connected across three-quarters of the load impedance 80 through the tap 81 and is provided by a diode 82, a resistor 83, and a condenser 84. The output terminal 58 of the amplifier is intended for direct current connection with the brilliancy control electrode 59 of tube 17.

In the operation of the Fig. 9 arrangement, a video signal including its received direct current component is derived by detector 25 and applied to the input circuit of amplifier 45. This video signal after translation through amplifier 45 appears across voltage divider 80. The output obtained at the terminal 58 is identical with that obtained in the Fig. 4 arrangement since these circuit arrangements differ only in the supply for their voltage dividers. In Fig. 9 the voltage divider is supplied by the amplifying tube 45, whereas in Fig. 4 it is supplied by the detector 25'. The video signal obtained at output terminal 58 is stabilized with reference to its black level in a manner generally similar to that indicated by the series of curves of Fig. 5.

The A. C. C. diode 49 receives the amplified video signal including its received direct current component and the control signal generated in integrating circuit 50, 51 is obtained in a manner completely described in the aforementioned copending application. The advantage obtained with this modification is that the A. C. C. system utilizes an amplified video signal including all of its received direct current components so that the system has increased sensitivity.

Each of the embodiments of the invention has been described in connection with a video signal in which the black level corresponds with 75 per cent. of the maximum signal amplitude. It is for this reason that certain of the specific embodiments show a signal ratio of one to three in the several diodes relied upon to develop a pair of signals to be combined in producing an output signal stabilized with respect to its black level. It will be understood that the invention is not limited to the transmission of a video signal in which the black level corresponds to 75 per cent. of the maximum carrier-wave amplitude. Where other signal compositions are used, it is only necessary to adjust the described circuit so that one signal includes a component that has amplitude values which are equal to and vary in substantially the same manner with variations in signal intensity as the black level of another signal having its received direct current component. Where this operating criterion is satisfied, the combination of such signals provides the desired output video signal stabilized on its black level.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A television receiver background control circuit comprising, means for obtaining a video signal including recurrent components, video frequency components and the direct-current components, in which said recurrent components represent the maximum amplitude of said video signal, as measured from a first reference level, while a predetermined fractional portion of said maximum amplitude represents the black level of said video signal, a circuit arrangement for deriving a second signal including recurrent components and video frequency components, one of said last-mentioned components having amplitude values with respect to a second reference level which are equal but of opposite polarity to and vary in substantially the same manner with variations in signal intensity as said black level of said video signal with respect to said first reference level, means for combining said video signal and said second signal to produce an output video signal and means for so stabilizing said second signal that the black level of said output signal is made substantially independent of variations of signal intensity of said first-mentioned video signal.

2. A television receiver background control circuit comprising, means for obtaining a video signal including recurrent components, video frequency components and the direct-current components, in which said recurrent synchronizing components represent the maximum amplitude of said video signal, as measured from a first reference level, while a predetermined fractional portion of said maximum amplitude represents the black level of said video signal, a circuit arrangement for deriving a second signal including recurrent components and video frequency components, one of said last-mentioned components having amplitude values with respect to a second reference level which are equal but of opposite polarity to and vary in substantially the same manner with variations in signal intensity as said black level of said video signal with respect to said first reference level, means for combining said video signal and said second signal to produce an output video signal and means for so stabilizing said second signal that the black level of said output signal is made substantially independent of variations of signal intensity of said first-mentioned video signal.

3. A television receiver background control circuit comprising, means for obtaining a video signal including recurrent components, video frequency components and the direct-current components, in which said recurrent components represent the maximum amplitude of said video signal, as measured from a first reference level, while a predetermined fractional portion of said maximum amplitude represents the black level of said video signal, a circuit arrangement for deriving a second signal including recurrent components and video frequency components, one of said last-mentioned components having amplitude values with respect to a second reference level which are equal but of opposite polarity to and vary in substantially the same manner with variations in signal intensity as said black level of said video signal with respect to said first reference level, means for combining said video signal and said second signal to produce an output video signal, means for so stabilizing said second signal that the black level of said output signal is made substantially independent of variations in the signal intensity of said first-mentioned video signal, and a contrast control for selectively adjusting the intensity of said output video signal.

4. A television receiver background control circuit comprising, means for obtaining a video signal including recurrent components, video frequency components and the direct-current components, in which said recurrent components represent the maximum amplitude of said video signal, as measured from a first reference level, while a predetermined fractional portion of said maximum amplitude represents the black level of said video signal, a circuit arrangement for deriving from said video signal a second signal which includes recurrent components and video frequency components, one of said last-mentioned components having amplitude values with respect to a second reference level which are equal but of opposite polarity to and vary in substantially the same manner with variations in signal intensity as said black level of said video signal with respect to said first reference level, means for combining said video signal and said second signal to produce an output video signal and means for so stabilizing said second signal that the black level of said output signal is made substantially independent of variations of signal intensity of said first-mentioned video signal.

5. A television receiver background control circuit comprising, means for obtaining a video signal including recurrent components, video frequency components and the direct-current components, in which said recurrent components represent the maximum amplitude of said video signal, as measured from a first reference level, while a predetermined fractional portion of said maximum amplitude represents the black level of said video signal, a circuit arrangement comprising a rectifier and an integrating load circuit having a discharge time constant long in comparison with the periodicity of said recurrent components for deriving from said video signal a second signal which includes recurrent components and video frequency components, one of said last-mentioned components having amplitude values with respect to a second reference level which are equal but of opposite polarity to and vary in substantially the same manner with variations in signal intensity as said black level of said video signal with respect to said first reference level, means for combining said video signal and said second signal to produce an output video signal and means for so stabilizing said second signal that the black level of said output signal is made substantially independent of variations of signal intensity of said first-mentioned video signal.

6. A television receiver background control circuit comprising, means for obtaining a first video signal including recurrent components, video frequency components and the direct-current components, in which said recurrent components represent the maximum amplitude of said first signal, as measured from a reference level, while a predetermined fractional portion of said maximum amplitude represents the black level of said first signal, a circuit arrangement for deriving a second video signal which includes recurrent components, and video frequency components, said second video signal being similar to said first signal but stabilized with respect to said recurrent components and of such intensity that the black level thereof has amplitude values with reference to the stabilizing level of said second signal which are equal but of opposite polarity to and vary in substantially the same manner with variations in signal intensity as said black level of said first signal with respect to said first reference level, means for combining said first and second signals to produce an output video signal and means for so stabilizing said second signal that the black level of said output signal is made substantially independent of variations of signal intensity of said first-mentioned video signal.

7. A television receiver background control circuit comprising, means including a first portion of a potential divider for obtaining a first video signal including recurrent components, video frequency components and the direct-current components, in which said recurrent components represent the maximum amplitude of said first signal, as measured from a reference level, while a predetermined fractional portion of said maximum amplitude represents the black level of said first signal, a circuit arrangement including a second portion of said potential divider for deriving a second video signal which includes recurrent components, and video frequency components, said second video signal being similar to said first signal but stabilized with respect to said recurrent components and of such intensity that the black level thereof has amplitude values with reference to the stabilizing level of said second signal which are equal but of opposite polarity to and vary in substantially the same manner with variations in signal intensity as said black level of said first signal with respect to said first reference level, means for combining said first and second signals to produce an output video signal and means for so stabilizing said second signal that the black level of said output signal is made substantially independent of variations of signal intensity of said first-mentioned video signal.

8. A television receiver background control circuit comprising, means including at least a portion of a potential divider for obtaining a first video signal including recurrent components, video frequency components and the direct-current components, in which said recurrent components represent the maximum amplitude of said first signal, as measured from a reference level, while a predetermined fractional portion of said maximum amplitude represents the black level of said first signal, peak rectifying means coupled to a selected portion of said potential divider and having an integrating load circuit with a discharge time constant long in comparison with the periodicity of said recurrent components for developing by peak rectification of said recurrent components a second signal which includes recurrent components, and video frequency components, and that has amplitude levels which are equal but of opposite polarity to and vary in substantially the same manner with variations in signal intensity as said black level of said first signal with respect to said first reference level, means for combining said first and second signals to produce an output video signal and means for so stabilizing said second signal that the black level of said output signal is made substantially independent of variations of signal intensity of said first-mentioned video signal.

9. A television receiving system for translating a received negatively modulated carrier-wave television signal comprising, a detector for deriving from said received signal a video signal including recurrent components, video frequency components and the direct-current components, in which said recurrent components represent the maximum amplitude of said video signal, as measured from a first reference level, while a predetermined fractional portion of said maximum amplitude represents the black level of said video signal, a circuit arrangement for deriving from said received signal a second signal including recurrent components and video frequency components, one of said last-mentioned components having amplitude values with respect to a second reference level which are equal but of opposite polarity to and vary in substantially the same manner with variations in signal intensity as said black level of said video signal with respect to said first reference level, means for combining said video signal and said second signal to produce an output video signal and means for so stabilizing said second signal that the black level of said output signal is made substantially independent of variations of signal intensity of said first-mentioned video signal.

10. A television receiver background control circuit comprising, means for obtaining a video signal including recurrent components, video frequency components and the direct-current components, in which said recurrent components represent the maximum amplitude of said video signal, as measured from a first reference level, while a predetermined fractional portion of said maximum amplitude represents the black level of said video signal, a circuit arrangement for deriving a second signal including recurrent components and video frequency components, one of said last-mentioned components having amplitude values with respect to a second reference level which are equal but of opposite polarity to and vary in substantially the same manner with variations in signal intensity as said black level of said video signal with respect to said first reference level, means for combining said video signal and said second signal to produce an output video signal, means for so stabilizing said second signal that the black level of said output signal is made substantially independent of variations in the signal intensity of said first-mentioned video signal, said output signal including said recurrent components, means for deriving a control signal having an amplitude determined by the amplitude of said recurrent components of said output signal, as measured from said black level thereof, and means for utilizing said control signal to control an operating characteristic of said translating system.

11. A television receiver background control circuit comprising, means for obtaining a video signal including recurrent components, video frequency components and the direct-current components, in which said recurrent components represent the maximum amplitude of said video signal, as measured from a reference level, while a predetermined fractional portion of said maximum amplitude represents the black level of said video signal, a circuit arrangement for deriving a second signal including recurrent components and video frequency components, one of said last-mentioned components having amplitude values with respect to a reference level which are equal to and vary in substantially the same manner with variations in signal intensity as said black level of said video signal with respect to the first-mentioned reference level, means for combining said video signal and said second signal to produce an output video signal that is stabilized with respect to its black level and includes said recurrent components, means for deriving a control signal having an amplitude determined by the amplitude of said recurrent components of said output signal, as measured from said black level thereof, and contrast control means for utilizing said output signal to control a gain characteristic of said system and maintain the intensity of said output video signal within a relatively narrow range of values.

12. A television receiver background control circuit comprising, means for obtaining a video signal including recurrent components, video frequency components and the direct-current components, in which said recurrent components represent the maximum amplitude of said video signal, as measured from a reference level, while a predetermined fractional portion of said maximum amplitude represents the black level of said video signal, a circuit arrangement for deriving a second signal including recurrent components and video frequency components, one of said last-mentioned components having amplitude values with respect to a reference level which are equal to and vary in substantially the same manner with variations in signal intensity as said black level of said video signal with respect to the first-mentioned reference level, means for combining said video signal and said second signal to produce an output video signal that is stabilized with respect to its black level and includes said recurrent components, automatic-contrast-control means for deriving a control signal having an amplitude determined by the amplitude of said recurrent components of said output signal, as measured from said black level thereof, means for utilizing said control signal to control the gain of said translating system and maintain the intensity of said output video signal within a relatively narrow range of values, and means for adjusting said automatic-contrast-control means to determine said range of said output video signal.

ARTHUR V. LOUGHREN.

REFERENCES CITED

The following references are of record in the file of this patent:

UNITED STATES PATENTS

| Number | Name | Date |
|---|---|---|
| 2,214,847 | Wilson | Sept. 17, 1940 |
| 2,244,240 | Blumlein | June 3, 1941 |
| 2,254,204 | Blumlein | Sept. 2, 1941 |
| 2,255,691 | Wilson | Sept. 9, 1941 |
| 2,259,520 | Freeman | Oct. 21, 1941 |
| 2,289,914 | Kell | July 14, 1942 |
| 2,307,375 | Blumlein et al. | Jan. 5, 1943 |
| 2,328,946 | Blumlein | Sept. 7, 1943 |
| 2,463,735 | Bedford | Mar. 8, 1949 |